(No Model.)  H. NADORFF.  2 Sheets—Sheet 1.

AMMONIA STILL.

No. 484,667. Patented Oct. 18, 1892.

Witnesses:
C. H. Raider
Thomas E. Turpin

Inventor
Henry Nadorff
By James J. Sheehy
Attorney (No Model.) 2 Sheets—Sheet 2.

H. NADORFF.
AMMONIA STILL.

No. 484,667. Patented Oct. 18, 1892.

Witnesses
Frank Pardon,
Henry Hubers.

Inventor
Henry Nadorff
By his Attorney
James J. Sheehy

UNITED STATES PATENT OFFICE.

HENRY NADORFF, OF LOUISVILLE, KENTUCKY.

AMMONIA-STILL.

SPECIFICATION forming part of Letters Patent No. 484,667, dated October 18, 1892.

Application filed April 11, 1892. Serial No. 428,742. (No model.)

*To all whom it may concern:*

Be it known that I, HENRY NADORFF, a citizen of the United States, residing at Louisville, in the county of Jefferson and State of Kentucky, have invented certain new and useful Improvements in Ammonia-Stills; and I do declare the following to be a full, clear, and exact description of the invention, such as will enable others skilled in the art to which it appertains to make and use the same.

My invention relates to an improved ammonia-still adapted for use in connection with absorption refrigerating-machines; and the object in view is to provide a simple apparatus designed to quickly and economically convert the liquid ammonia into ammonia gas or vapor.

With this end in view the invention consists in a closed receptacle provided with a liquid stand-pipe on its top, a liquid-supply pipe passing through said stand-pipe and having a perforated cap adapted to divide the liquid into small streams as it enters the receptacle, an upper tray or pan within the closed receptacle, a lower tray or pan below the upper tray, connected steam-coils in said upper and lower trays, and a dividing or percolating plate arranged above both trays and adapted to receive the liquid ammonia from the inlet-pipe and discharge it in a divided condition upon the steam-coils in the upper tray, from whence the liquid ammonia is conducted by overflow-pipes to the lower tray. Each tray has a vertical surrounding flange forming, with the bottom, a shallow inclosure, and in this inclosure is the heating-coil, which is thus immersed in a shallow bath of liquid ammonia, whereby the heating-coils are adapted to quickly convert the ammonia into gas or vapor, and thus effect an economy in the consumption of the liquid ammonia and in the fuel required to produce the requisite steam for heating the coils.

The invention further consists in the novel combination and construction of parts, as will be hereinafter fully described and claimed.

The invention is fully illustrated in the accompanying drawings, forming a part of this specification, and in which—

Figure 1:
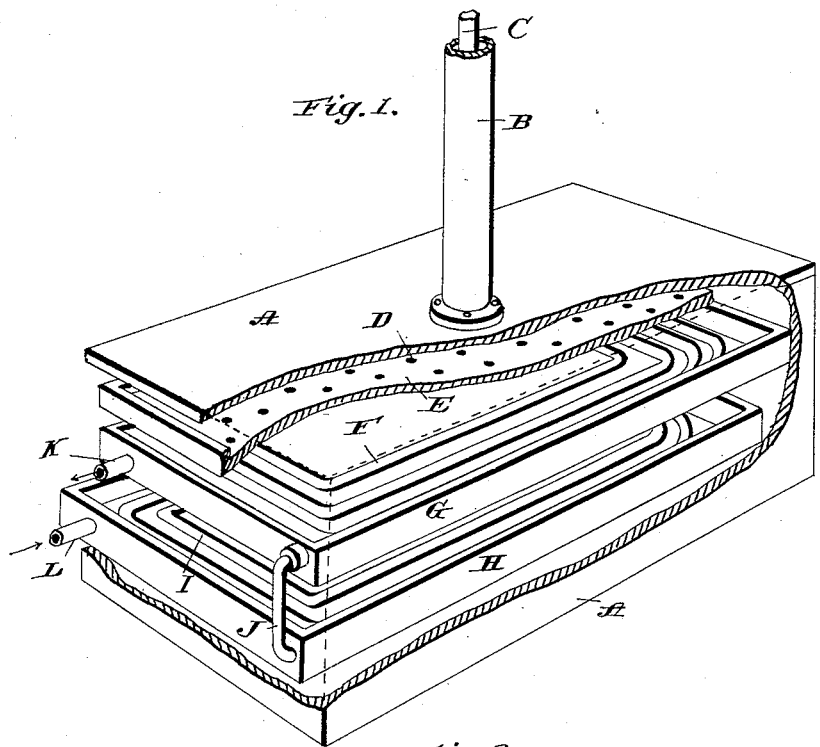
Figure 2:
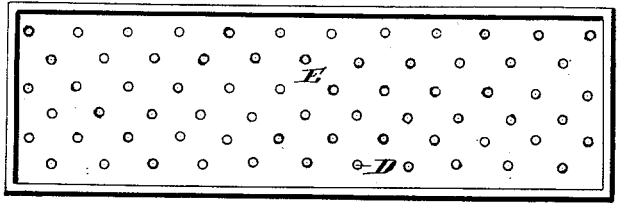
Figure 3:
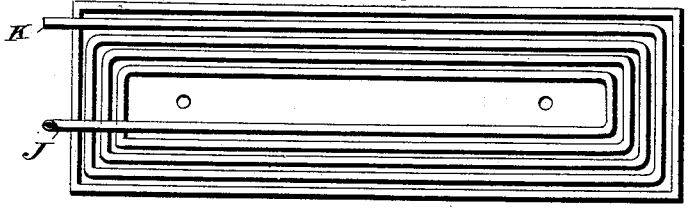
Figure 4:
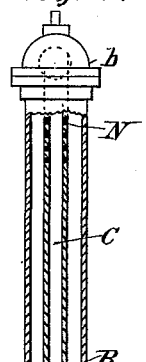
Figure 5:
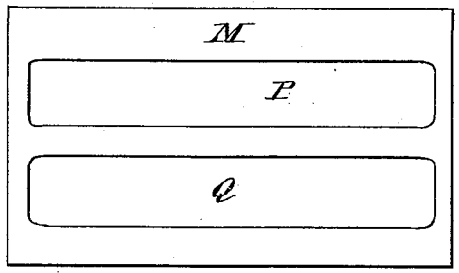
Figure 6:
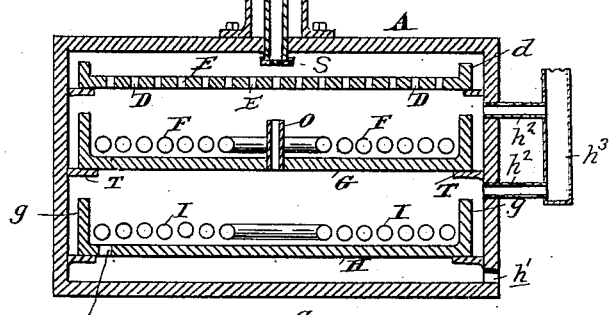
Figure 6:
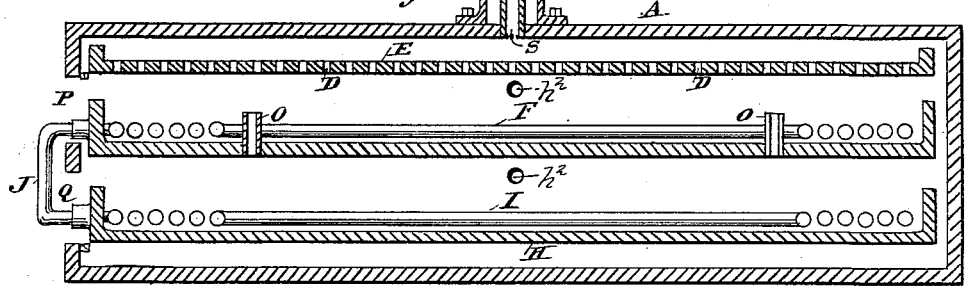

Figure 1 is a perspective view of my ammonia-still with parts of the casing broken away to illustrate the internal evaporating-trays. Fig. 2 is a detail plan view of the dividing or percolating plate or diaphragm. Fig. 3 is a plan view of one of the trays, showing the heating coil therein. Fig. 4 is a vertical transverse sectional view through the complete still. Fig. 5 is a detail view of the plate adapted to close the open front of the still, and Fig. 6 is a longitudinal sectional view through the still with the stand and liquid-inlet pipes broken away.

Like letters of reference denote corresponding parts in all of the figures of the drawings, referring to which—

A indicates the shell or receptacle of my improved ammonia-still, which may be made of any suitable form and dimensions, and which should be made of stout metal to resist internal pressure. On the top of the shell or receptacle A is erected a stand-pipe B for overflow liquid ammonia, which has its upper end closed, as at $b$, and the lower end of which does not communicate with the chamber of the shell A. Through this stand-pipe B passes the liquid-ammonia-supply pipe C, that leads from any suitable source of supply, and the lower end of this pipe C discharges into the chamber of the shell A. Said pipe C has overflow-openings N near its upper part, through which liquid ammonia is adapted to pass into the stand-pipe B, and over the lower end of said supply-pipe C is secured a foraminated or perforated cap S, upon which liquid ammonia falls and which serves to divide the liquid into thin streams as it emerges from the supply-pipe.

The stand-pipe B serves as a receptacle for the overflow liquid, which passes through the holes N of the supply-pipe C, as before described.

Within the upper part of the shell A is arranged a horizontal diaphragm or plate D, which is supported on suitable ledges in said shell. This diaphragm or plate is provided with a raised surrounding flange $d$ and with a multiplicity of perforations or holes E, through which the liquid ammonia must pass before it reaches the evaporating trays or pans G H, and thus the liquid ammonia is supplied in a divided condition and with regularity and uniformity to the trays or pans. The trays are arranged one above the other and supported at suitable distances from each other and the percolating-diaphragm by suitable ledges or brackets T, fixed within the shell A, and each tray has a vertical surrounding flange $g$, which projects but a short distance above the bottom thereof, so that the trays are quite shallow, and they are only adapted to contain a limited quantity of liquid ammonia, which is to be converted into ammonia vapor or gas by the action of heat produced by the heating-coils F I.

The heating-coil F is arranged within the upper tray G, above and out of contact with the bottom thereof, and the other heating-coil I is likewise arranged within the lower tray or pan H. The two heating-coils are connected by means of a pipe J, so that the steam passes from the one coil to another, the steam-inlet being indicated at L and the steam-outlet at K. (See Fig. 1.)

The front of the still is provided with an opening, which is closed by means of the front plate M, that is secured in place in any suitable way, and said front plate has two slots P Q, of a size sufficient to permit the evaporating trays or pans to be easily inserted into and removed from the shell of the still, the branch connection J between the coils of heating-pipes in the trays being situated outside of the still to permit of the ready removal of the trays for any purpose desired. The liquid ammonia in the upper tray overflows into the lower tray through the medium of the overflow-pipes O O, which are secured to and extend through the bottom of the upper tray, said pipes O terminating at a point below the upper surface of the surrounding flange $g$ of said tray G, and the lower tray is provided with an outlet $h$ for the escape of the liquid into the bottom of the still, from which it may be led through the opening $h'$. Leading through the walls of the shell and communicating with the interior thereof are branch pipes $h^2$, which are connected at their outer ends to a pipe $h^3$, designed to convey the gas or vapor from the shell to the refrigerating-machine. Although I prefer this arrangement of pipes for conveying the gas or vapor from the still, I do not desire to be confined to the same, as a single pipe might lead from the shell above the upper tray, in which case the gas or vapor generated in the lower tray will take up through the overflow-pipe O of the upper tray.

In operation, trays having been properly placed in the shell A, live steam is admitted to the heating-coils and liquid ammonia is supplied through the pipe C, from whence it is discharged in thin streams upon the perforated diaphragm D, which in turn divides the liquid ammonia into a larger number of streams, so that the same is spread over a large area and uniformly supplied to the upper tray. As the liquid ammonia accumulates in the upper tray in sufficient quantities to overflow into the pipes O O the liquid passes to the lower tray, and thus both trays are filled and supplied with shallow baths of liquid ammonia in which the heating-coils are just covered. The shallow baths of liquid ammonia being exposed to large areas of heating-surface by the coils, which nearly fill the trays, the liquid ammonia is quickly converted into ammonia gas or vapor, and I am thus enabled to effect this conversion in a more economical manner, with less fuel, and without such waste of the liquid ammonia than has heretofore been possible. The gas or vapor generated by the steam-coils in the trays is conducted from the still through the pipes before described.

It is evident that changes in the construction and arrangements of parts of the apparatus herein shown and described as an embodiment of my invention can be made by a skilled mechanic without departing from the spirit or sacrificing the advantages of my invention, and I therefore hold myself at liberty to make such modifications and alterations as fairly fall within the scope of my invention.

Having described my invention, what I claim is—

1. In an ammonia-still, the combination of a suitable shell, the shallow tray therein having a steam-heated coil within itself, a liquid-supply pipe, a perforated diaphragm or plate between the supply-pipe and tray, and a suitable means for leading the gas or vapor from the still, as and for the purpose described.

2. In an ammonia-still, the combination of a suitable shell, the shallow trays arranged therein one above the other, the overflow-pipe extending through the bottom of the upper tray, the connected steam-coils within said trays, the liquid-supply pipe, the perforated diaphragm or plate between the liquid-supply pipe and the upper tray, and a suitable means for leading the gas or vapor from the still, as and for the purposes described.

3. In an ammonia-still, the combination of a suitable shell, the stand-pipe erected thereon, the supply-pipe extending through said stand-pipe and having the openings near its upper end and the perforated cap at its lower end, the trays arranged within the inclosure, the heating-coils within said trays, the perforated diaphragm supported above the upper tray, and a suitable means for leading the gas or vapor from the still, as and for the purposes described.

4. In an ammonia-still, the combination of a suitable shell, a tray arranged therein, a heating-coil arranged within the tray, the stand-pipe erected on the shell, and the supply-pipe extending through the stand-pipe and having the openings near its upper end and also having perforations in its lower end, substantially as specified.

5. In an ammonia-still, the combination, with a suitable shell and the shallow tray arranged therein and having a steam-heated coil within itself, of a liquid-supply pipe, the perforated cap at the lower end of said pipe, and a perforated diaphragm arranged between the supply-pipe and the tray, substantially as specified.

In testimony whereof I affix my signature in presence of two witnesses.

HENRY NADORFF.

Witnesses:
 FRANK PARDON,
 HENRY HUBERS.